H. MANN.
Cultivator.
No. 22,437.
Patented Dec. 28, 1858.
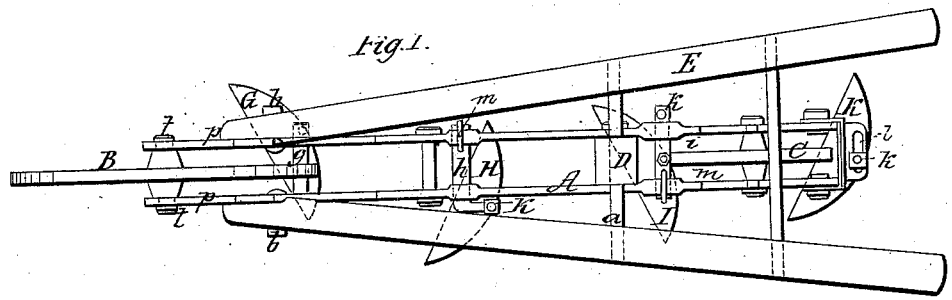
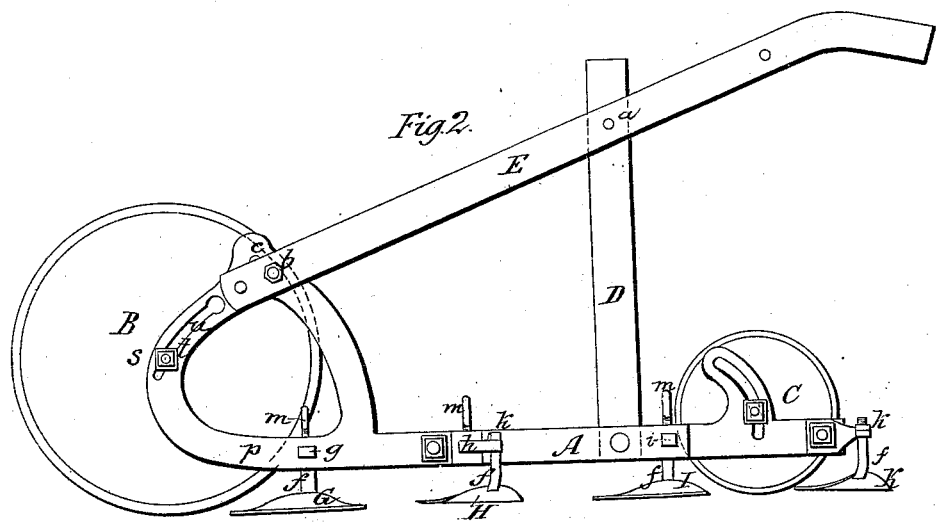
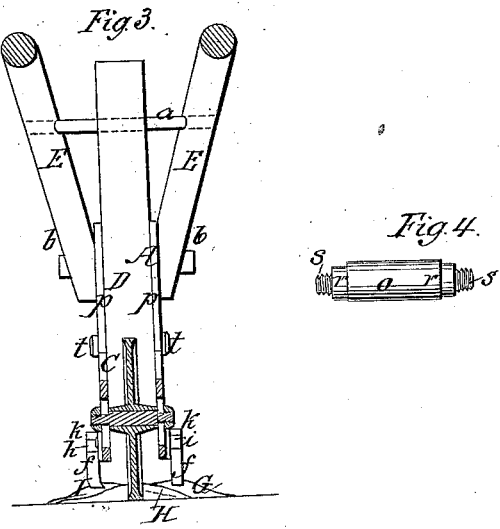

UNITED STATES PATENT OFFICE.

HOWARD MANN, OF EAST ATTLEBOROUGH, MASSACHUSETTS.

IMPROVEMENT IN CULTIVATORS.

Specification forming part of Letters Patent No. 22,437, dated December 28, 1858.

*To all whom it may concern:*

Be it known that I, HOWARD MANN, of East Attleborough, in the county of Bristol and State of Massachusetts, have invented an Improved Cultivator or implement for weeding and turning and loosening soil; and I do hereby declare that the same is fully described and represented in the following specification and the accompanying drawings, of which—

Figure 1 is a top view of the said cultivator; Fig. 2, a side elevation of it; Fig. 3, a transverse section taken through the arbor of the front wheel.

This cultivator resembles in many respects that for an improvement on which Letters Patent No. 17,797 were granted to me on the 14th day of July, A. D. 1857, my present improved cultivator being made with its knives or root-cutters so arranged and applied in front of the rear wheel as to cut, loosen, and turn the soil in opposite directions, in a manner as will be hereinafter described; also, with an obliterator or cutter arranged in rear of the hind wheel, and for the purpose not only of cutting weeds, but of obliterating the imprint of the wheel and turning up and loosening the soil after it may have been pressed down or compacted by such wheel.

The nature of my invention consists in so applying each wheel-arbor to the wheel and frame of the machine, and in certain slots in the frame, that the wheel may turn on the arbor, and not only be adjustable in height in the frame, but serve, with its confining-nuts or contrivances, as a cross-tie of the frame.

The nature of my invention further consists in a peculiar arrangement of each of the slots of each wheel-arbor with respect to the scraper of the wheel, whereby the wheel, at whatever height at which it may be adjusted, is maintained at the same distance from the scraper.

My invention further consists in an application or arrangement of the slide-bar of each knife post or rod, so as not only to operate as a scraper of the adjacent wheel, but as a supporter of the knife post or rod.

In the drawings, A denotes the frame or carriage-body of the machine as supported by two wheels, B C, and having a post, D, extended upward between the wheels, as shown in the drawings, the said carriage-body and post having two handles, E E, applied to them and arranged with respect to them as shown in Figs. 1 and 2. These handles are levers whose fulcra are at the two ends of the bar a, extended horizontally through the upper part of the said post, the lower end of each lever being secured to the frame by a screw and nut, as shown at b. The frame is provided with holes c c, arranged at different heights and for the reception of the said screw, and to enable the handles to be adjusted or varied in their heights above the ground, as circumstances may require.

Connected with the frame A is a series of knives or cutters and scrapers, G H I, each of which, when in use, not only performs the office of cutting roots or drawing the same out of place in the soil, but serves to scrape or hoe the land and turn it over. Each cutter, G, H, or I is arranged obliquely with respect to the frame, as shown in the drawings, the first two—viz., G and H—not only being made to stand in opposite directions with respect to one another, but to have a slight inclination to the horizontal plane of the implement. The third cutter or knife, I, (constructed like the others,) is arranged so as to stand in an oblique direction, in reverse to that of the cutter H, the same being as shown in the drawings. This arrangement of the cutters causes them, when the machine is moved forward on the ground and between rows of plants, not only to cut into the soil and among the weeds with a drawing stroke, but to turn the soil in opposite directions, or at least twice over, one cutter throwing it laterally in one direction and the other returning it in place, the weeds during such operation being cut off or extracted, more or less, from the soil.

In rear of the rearmost wheel, C, and arranged obliquely, like the cutter H, and so as to extend entirely across the wheel C, in manner as shown in the drawings, is another knife and scraper, K, which I term the "obliterator," its purpose being to cut into, scrape, and loosen the soil where it has been pressed downward by the rear wheel.

Each of the cutters is fastened to the lower end of a vertical post or rod, $f$, which, in the case of each of the cutters G H I, extends through and so as to be capable of being turned around horizontally in a horizontal slide-bar, $g$, $h$, or $i$. Where it extends above the slide-bar the rod $f$ is furnished with a screw, on which a nut, $k$, is screwed, so as to confine the rod $f$ to the slide-bar. For the reception of the post of the rearmost cutter or obliterator, K, the frame is furnished with a slot, l, arranged in it, as shown in Fig. 1. The supporting-bar g, h, or i of each cutter should be applied to the frame A so as to be capable of being moved to and fro in a direction transversely of the frame. A set-screw, m, passes through the frame over each slide-bar, and is for the purpose of fastening the bar in such position as may be desirable in the matter of adjusting the cutter of the bar either farther from or nearer to the vertical plane of the middle of the machine. Furthermore, the slide-bar g of the forward cutter is arranged so as to perform (while the machine is in operation) another operation—viz., that of clearing or scraping from the periphery of the front wheel any dirt or extraneous matters which may accumulate thereon.

Each wheel turns on an arbor which is stationary relatively to such wheel, but so applied to the frame A as to be capable of being adjusted in height and fixed therein in any desirable position, such as may be sufficient to admit of the entrance of the cutters at the proper depth into the ground while the machine may be in use, such depth varying according to circumstances well understood by farmers. The arbor of the front wheel is shown at o, (a side view of it being shown in Fig. 4.) It extends through curved slots u made in the side pieces, p p, of the frame A, and is made with shoulders r and screws s s at its opposite ends. On these screws nuts t t are screwed, and serve to clamp the arbor to the frame. The arbor of the rear wheel should be applied to the frame in a manner similar to that of the front wheel.

The slots u are curved with radii whose centers are at that edge of the scraper or bar g which serves to free the circumference of the wheel B. This causes the periphery of the wheel to always stand at the same distance from the scraper, at whatever height the wheel-arbor may be fixed in the slots.

In using the cultivator it may be pushed forward over the surface of the land by manual power applied to the handles; or it may be drawn by horses or other suitable quadrupeds.

I claim—

1. The application of each wheel-arbor to its wheel and the frame A, substantially as described—viz., so that the wheel may turn on the arbor and the latter extend into slots, and have fastenings, as explained, whereby not only the wheel may be adjustable with reference to the cutters, but the arbor and its screws and nuts may be employed to strengthen the frame in the manner set forth.

2. The above-described arrangement of each of the slots of the wheel-arbor with respect to the scraper of the periphery of the wheel, whereby the wheel, at whatever altitude it may be placed while its arbor is in the slots, will be at one uniform or proper scraping distance from the scraper.

3. The application or arrangement of the slide-bar of the cutter G, so as to operate not only as a scraper to the wheel, but as a supporter of the cutter post or rod.

In testimony whereof I have hereunto set my signature.

H. MANN.

Witnesses:
L. W. DEAN,
N. S. LUTHER.